Dec. 2, 1930.  J. W. CARLSON  1,783,219
CHECK PROTECTOR
Filed July 19, 1928  11 Sheets-Sheet 2

Fig. 2.

Inventor
John W. Carlson
By Williams, Bradbury, McCaleb & Hinkle Attys.

Dec. 2, 1930.  J. W. CARLSON  1,783,219
CHECK PROJECTOR
Filed July 19, 1928   11 Sheets-Sheet 9

Inventor
John W. Carlson
By Williams, Bradbury, McCaleb
& Hinkle
Attys.

Dec. 2, 1930.  J. W. CARLSON  1,783,219
CHECK PROTECTOR
Filed July 19, 1928  11 Sheets-Sheet 11

Inventor
John W. Carlson
By Williams, Bradbury,
McCaleb & Hinkle Attys.

Patented Dec. 2, 1930

1,783,219

UNITED STATES PATENT OFFICE

JOHN W. CARLSON, OF CHICAGO, ILLINOIS, ASSIGNOR TO THE HEDMAN MANUFACTURING COMPANY, OF CHICAGO, ILLINOIS, A CORPORATION OF ILLINOIS

CHECK PROTECTOR

Application filed July 19, 1928. Serial No. 293,906.

My invention relates, generally, to check protectors and more particularly to improvements in so-called "10-key" machines.

It is an object of my invention to provide a relatively simple 10-key, key-set check writer in which improved means are utilized for setting up the type segments.

A further object is to provide a 10-key, key-set check writer having improved type segment restoring means.

A further object is to provide improved means for controlling repeat operations in a machine of the above-mentioned type.

A further object is to provide improved operating mechanism in a key-set check writer.

A further object is to provide a machine of the above-mentioned type which is positive in operation and which can be economically manufactured.

Other objects will appear from the following description, reference being had to the accompanying drawings, in which.

My improved machine comprises, generally, key controlled setting up mechanism for positioning the type segments in alignment to print and scarify the desired amount upon the check; operating mechanism for actuating the moving parts of the machine; means for restoring the setting up mechanism; means for inking the type; means for scarifying the payee's name portion of the check; platen means for the amount printing and scarifying type and for the payee's name scarifying means; and mechanism for controlling the machine to cause repeat operations by disabling the restoring means.

The machine in general

The machine comprises a base 20, preferably a casting, having four rubber feet 22 secured thereto. The base casting has a pair of arms 24 and 26 secured at the rearward end thereof, these arms projecting upwardly and forwardly and serving as a partial support for the mechanism proper which is mounted within a suitable cover casing which comprises side plates 28 and 30, top plate 32 and lower plat 34. The mechanism is in general carried by side frames 36 and 38. The cover casing and side frames are pivoted upon a shaft 40, the ends of which are fixed in the arms 24 and 26.

Means for setting up the type segments

The type segments are normally under spring tension so as to rotate, and means are provided to position a stop and at the same time release the type segment and thus position the desired type for printing upon the check. The simple and effective means for accomplishing this purpose are best shown in Figs. 2, 3, 4, 11 to 14, 16 and 17.

The type segments each have twelve printing positions corresponding to the digits "0 to 9", the word "and" and the abbreviation "Cts" and I have therefore provided twelve keys 42 corresponding to the above designated type segment positions. The keys 42 have key stems 44 which are attached to key plates 46. The key plates 46 are guided for arcuate sliding movement by a cover plate 48 which is secured to the side frames 36 and 38 by having ears 50 (Figs. 6 and 7) projecting through notches 52 in the side frames, the ears being secured to the side frames by screws 54.

Figure 11:
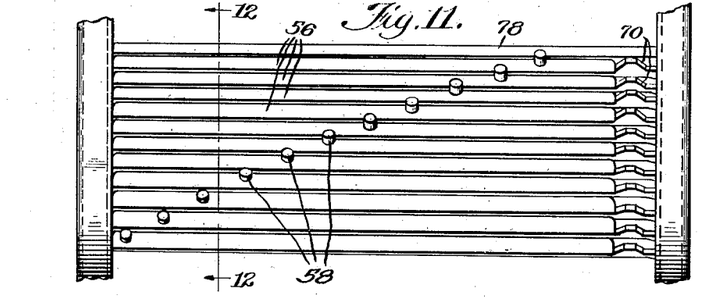
Fig. 11 is a front elevation of the cam stop bar assembly.
Figures 12, 14:
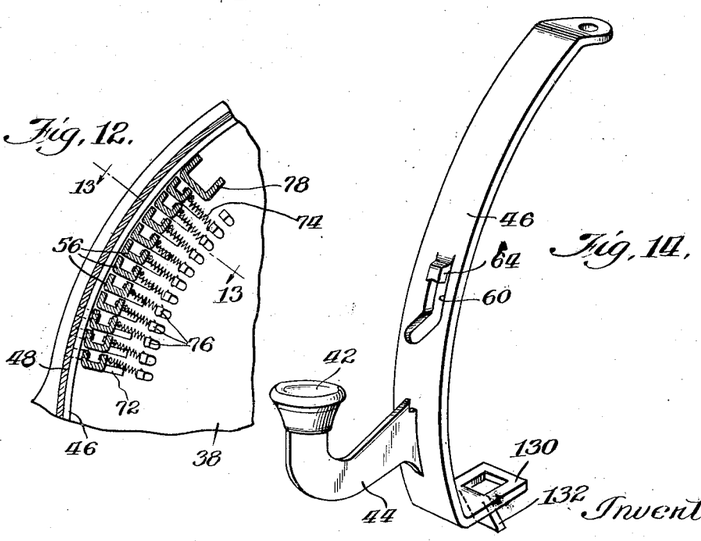
Fig. 12 is a transverse sectional view thereof taken on the line 12—12 of Fig. 11.
Fig. 14 is a perspective view of one of the keys and its attached plate.

The key plates 46 lie adjacent transversely movable stop bars 56, one corresponding to each of the keys 42 except the "9" key. Each of the stop bars 56 has a short pin 58 secured thereto, these pins being in stepped relationship, as best shown in Fig. 11. The pins 58 project through a dog leg slot 60 cut in each of the key plates 46 and also into substantially inverted T-shaped slots 62 formed in the cover plate 48.

An ear 64, punched outwardly at the upper end of each of the slots 60, is adapted to ride in the vertical portion of one of the slots 62, thus aiding in guiding the key plate in its arcuate movement. The key plates are also guided through the engagement of the key stems 44 in slots 66 formed at the lower edge of the cover plate 48.

Figure 13:
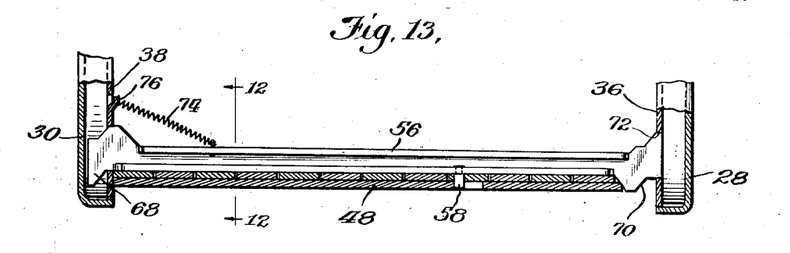
Fig. 13 is a transverse sectional view taken on the line 13—13 of Fig. 12.

As best shown in Fig. 13, the stop bars 56 have camming portions 68 and 70 at their ends which are guided in suitable slots 72 formed in the side frames 36 and 38. Each of the stop bars 56 has one end of a tension spring 74 secured thereto, the other end of the spring being anchored to an ear 76 struck outwardly from the side frame 38.

These springs serve normally to hold the bars 56 in their leftmost position, as shown in Fig. 13. A twelfth stop bar 78 is rigidly secured between the side frames 36 and 38.

A pair of supporting rods 80 and 82 are rigidly carried by the side plates 36 and 38, serving as supports for pawl release members 84, guide and separator plates 86 and notched plates 88. The plates 86 are separated by the notched plates 88 and also by suitable washers 87 and are held in proper position on the rods 80 and 82 by tubular separators 89 and 91. The plates 86, notched plates 88 and release members 84 are held together as a unit by a rod 85 which passes through suitable holes formed in these parts, the parts being held in the position of the rod by screws 93 and 144 at the ends of the rod. It will be understood that there are three plates 86, one notched plate 88 and one pawl release member 84 for each bank of the machine. In the machine illustrated there are eleven banks, thus making it possible to write amounts up to $9,999,999.99, the two extra banks being used to print the word "and" and the abbreviation "Cts."

Each of the pawl release members 84 has an enlarged circular opening 90 formed at its upper end, to receive the rod 82 with its washers 87. The circular opening 90 is, however, sufficiently larger than the spacer washer 87 to permit the pawls not only to rotate relative to the rod but also to have a translatory movement with respect thereto. At the lower end of each pawl there is a sidewardly bent portion 92 which is adapted normally to lie in contact with the lower end 94 of a stop pawl 96.

The pawl 96 has a tooth 98 adjacent its lower end which is adapted to engage in one of the notches of the notched plate 88. Each of the pawls 96 is pivotally connected at 100 to an arm 102 which in turn is mounted for free pivotal movement upon a shaft 104.

A tension spring 106 has one end connected to a hook 108 formed at the end of the pawl 96, the other end of the spring being anchored to an ear 110 formed at the lower end of a plate 112 which is rigidly fixed between the sides frames 36 and 38.

Figure 2:
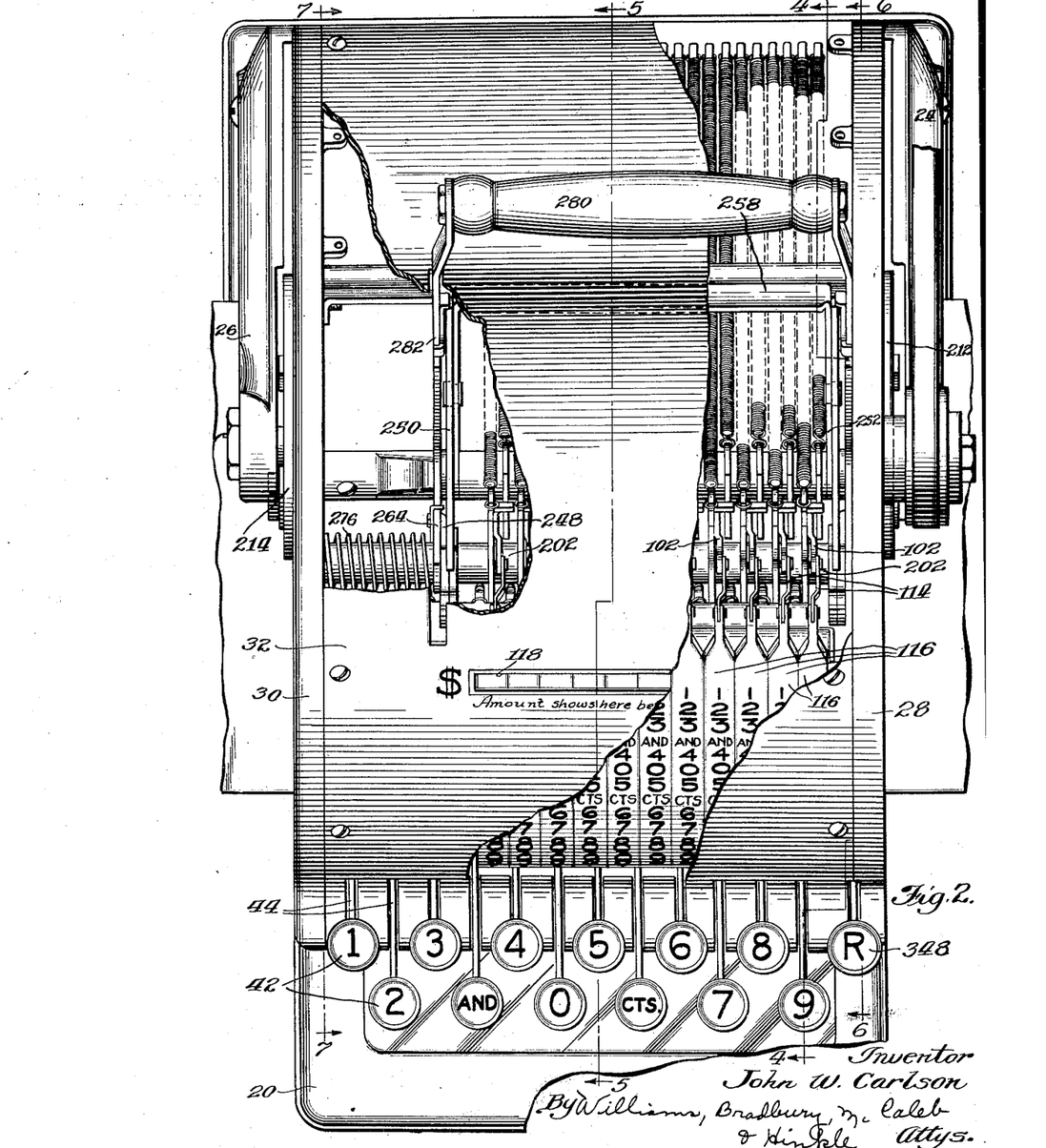
Fig. 2 is a plan view with portions of the casing broken away to show the internal construction.
Figure 3:
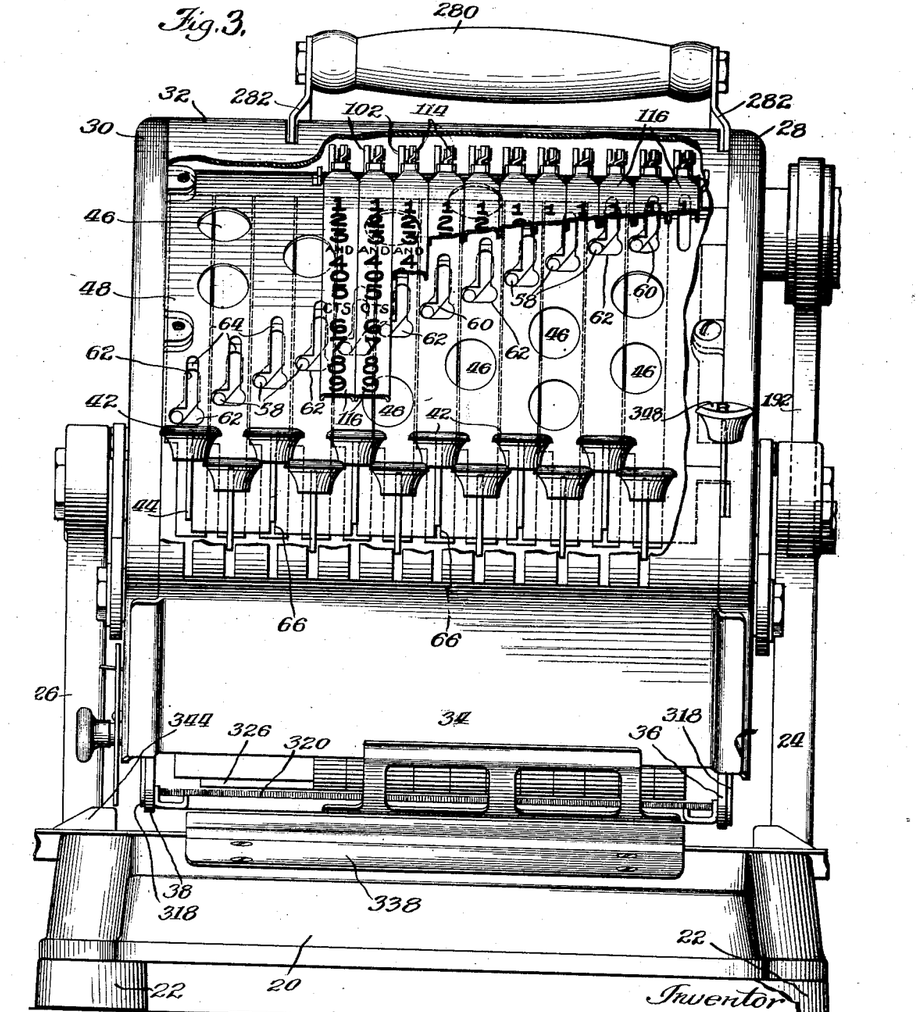
Fig. 3 is a front elevation with a fragment of the casing removed to show the parts of the setting up mechanism.

The extremity of each of the arms 102 is connected by a link 114 with an arcuate numeral slide 116. Each of the slides 116 bears the indicia of the digits "1 to 9", the word "and" and the abbreviation "Cts", as best shown in Fig. 2, the indicia being visible through a window 118 formed in the top casing 32. Thus, the degree of movement of each of the pawls 96 is visibly registered as soon as the pawl takes its set position with its tooth 98 locked in one of the teeth of the ratchet plate 88.

A pair of arms 120 and 122 are pivotally mounted upon studs 124 secured in the side frames 36 and 38 and at their forward ends have a pair of bail rods 126 and 128 which extend transversely across the machine. The bail rod 126 lies beneath a rearward projection 130 formed at the lower end of each of the key plates 46 and is also engaged by a lug 132 bent outwardly from each of the projections 130, while the bail rod 128 lies in front of cam surfaces 134 formed at the forward edge of the lower ends of the pawls 96, thus normally locking these pawls with their teeth 98 in the lowermost notches of the notched plates 88.

A bail comprising arms 136 and cross bar 138 is rigidly secured to the arms 120 and 122 so as to move therewith. Thus, upon depression of any one of the keys, its rearward projection 130 will press downwardly upon the bail rod 126 and rock the bail arms 120 and 122 counterclockwise about their pivot studs 124 and swing the bar 138 forwardly into engagement with the rearwardly projecting point 140 of one of the pawl releasing members 84.

The point 140 of the leftmost pawl 84 (Fig. 17) is normally held downwardly and rearwardly so as to lie within the path of the bar 138 by a grasshopper spring 142 which is coiled about the rod 82 and anchored by a screw 144 to the rod 85.

Each of the members 84 has a lug 146 projecting leftwardly in a horizontal plane just beneath the point 140. As will hereinafter appear, the successive depression of the keys successively releases the type segments so that the pawls 84 thus successively drop into position where they may be actuated by the bar 138.

Figure 4:
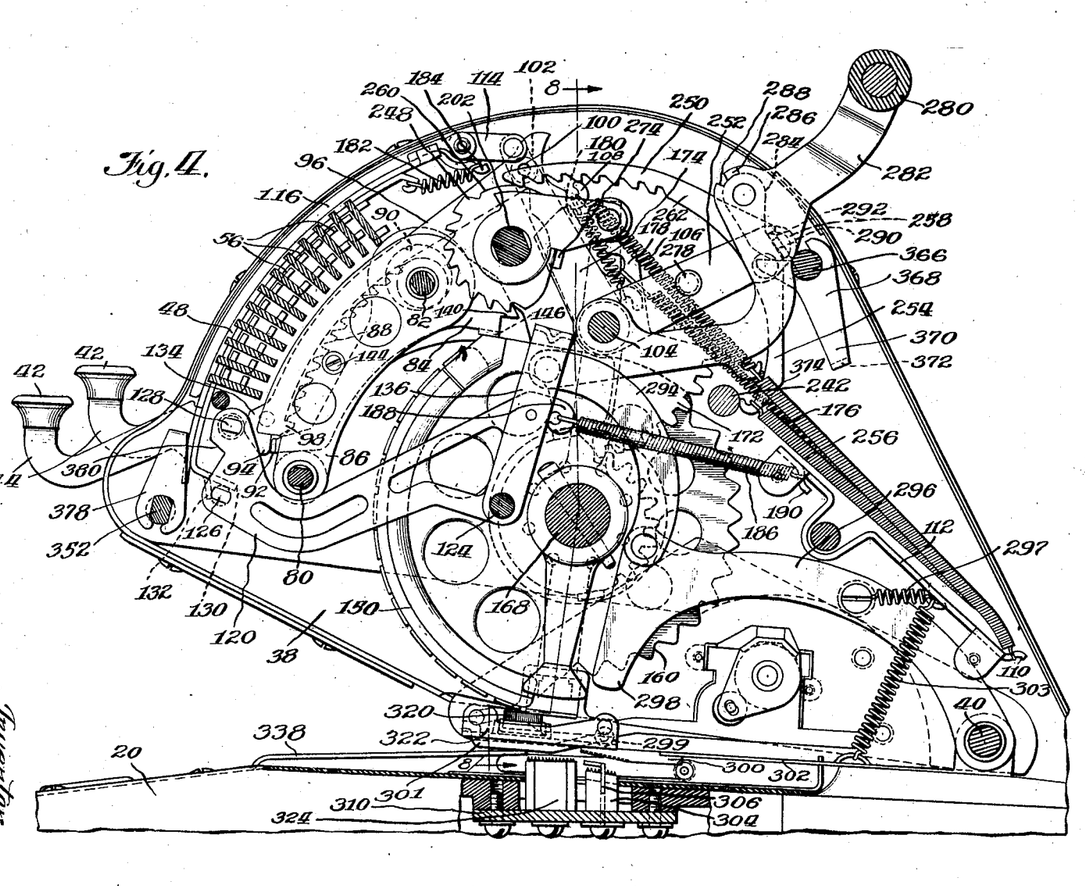
Figs. 4, 5 and 6 are longitudinal vertical sections taken on the lines 4—4, 5—5 and 6—6, respectively, of Fig. 2, looking from the right-hand side of the machine.
Figure 5:
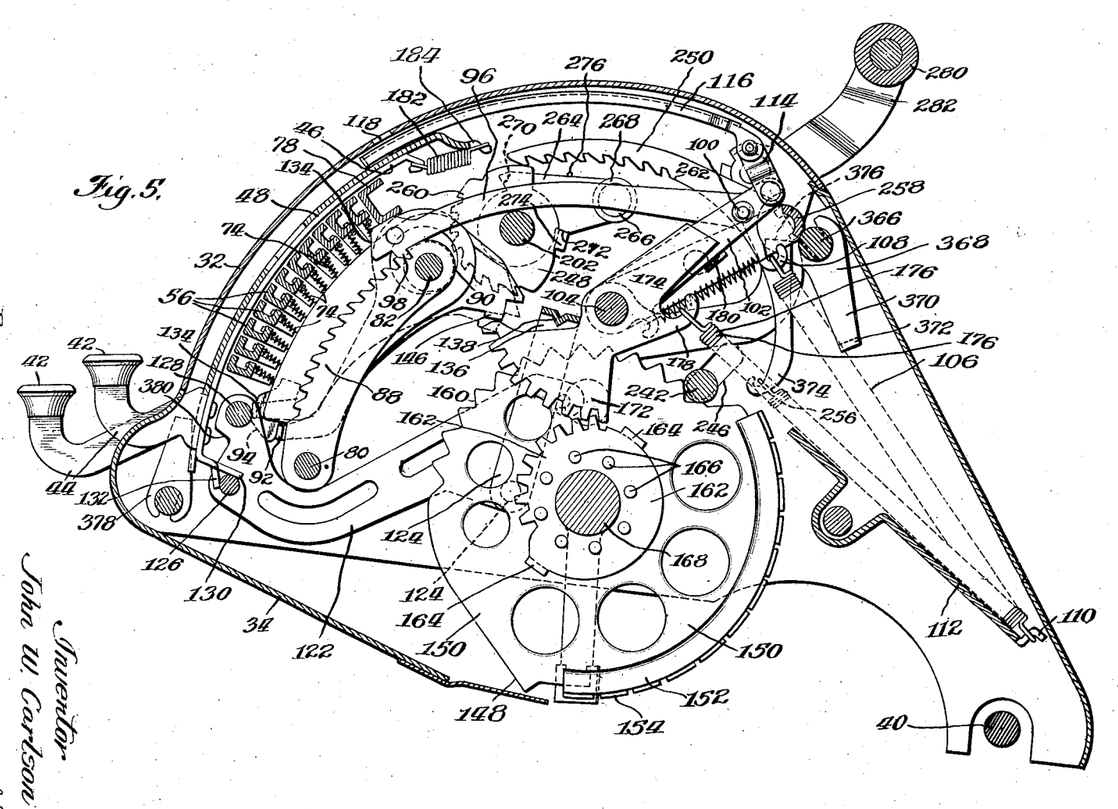
Figure 8:
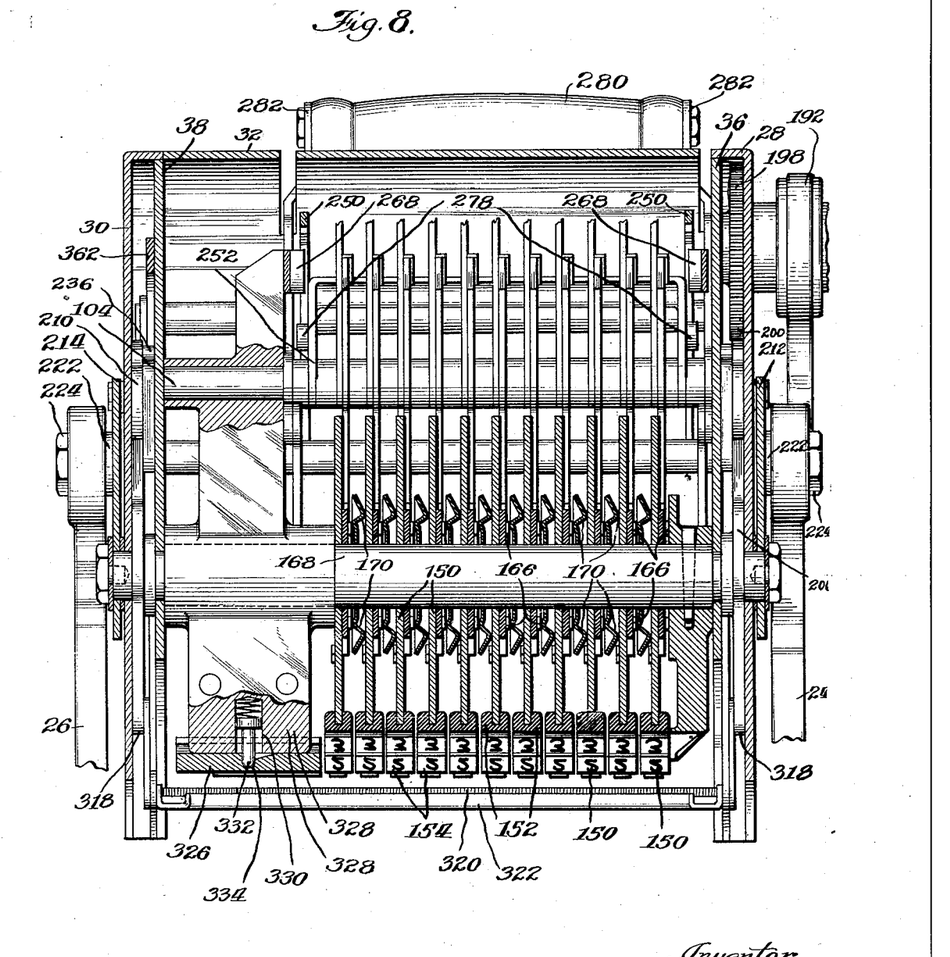
Fig. 8 is a transverse vertical section taken substantially on the line 8—8 of Fig. 4, looking toward the rear of the machine.

As best shown in Figs. 4, 5 and 8, the type segments 150 each comprises a substantially circular plate which is suitably apertured to lighten its weight and which has rigidly secured thereto an arcuate type bar 152 having type 154 formed integrally therewith. The segment also has a plurality of notches 160 formed at its periphery. A segmental gear 162 is secured to each of the segments by a pair of lugs 164 which project through the segment plate and are riveted thereupon. Each of the segmental gears 162 has a plurality of punched out projections 166.

The segments 150, with their segmental gears 162, are mounted for free rotation upon a shaft 168, the segments 150 being separated the proper distance on the shaft by spacing washers 170. These washers are substantially V-shaped in radial cross section, as best shown in Fig. 8, and are adapted to contact with the projections 166 of one of the segmental gears 162 and the side surface of the adjacent segment plate 150. It is, of course, highly desirable that the type segments be very accurately spaced upon the shaft 168 and, since in production the thickness of the segment plates 150 and the segmental gears 162 will vary to some extent, it is necessary in some manner to compensate for such differences in thickness and the punched out projections 166 are therefore provided for this purpose.

After the segmental gear 162 has been riveted to the segment plate 150, the parts are placed in a suitable press and pressure applied to the projections 166 so that the overall thickness of the combined type segment plate and its segmental gear may be reduced to the exact dimension required. This method of assembling these parts has been found to be very efficient and results in a perfect spacing of the type segments.

A segmental gear 172, formed integrally with a stop arm 174, is freely mounted upon the shaft 104 and is in mesh with the teeth of the segmental gear 162. A spring 176 has one end attached to a hook 178 formed integrally with the segment 172 and arm 174 and has its other end anchored to a lug 110 formed on the plate 112. With the type segment in normal position, as shown in Fig. 4, the spring 176 is tensioned so as to tend to rotate the arm 174 and segmental gear 172 clockwise about the shaft 104 and hence rotate the type segment 150 counterclockwise about the main shaft 168.

Movement of the parts in this direction is normally prevented by a lug 180 which projects sidewardly to the right and lies in the path of the stop arm 174.

Upon depression of any one of the keys 42, the corresponding stop bar 56 will be shifted downwardly into effective position, the stop pawl 96 released by the pawl 92 through reciprocation of the bar 138 and when the pawl 96 reaches the stop bar 56 its cam portion 134 will engage the bar and thus be moved downwardly, causing the tooth 98 of the pawl to enter in that one of the notches in the notched plate 88 which is in alignment with the stop bar 56 which has been actuated. Simultaneously with the movement of the pawl 96, the spring 176 will rotate the type segment 150 until movement of the stop arm 174 is arrested by the lug 180.

All of the parts actuated by the spring 106 are very light in weight so that these parts snap into position with extreme rapidity. Due to the greater weight of the type segment 150 and all of the parts geared therewith, the spring 176 will move these parts relatively slowly until the arm 174 overtakes the arm 102 and is arrested by the lug 180. I consider this one of the very advantageous features of the machine of my invention since it makes possible the operation of the machine by depression of the keys in very rapid succession. In fact, it is impossible to manually depress the keys with sufficient rapidity to have the key released before the pawl 96 is in proper position. Furthermore, the type segment may rebound after being arrested by the set stop without deranging the stop. The type segment will, of course, quickly decrease the amplitude of its oscillatory rebound and come to rest in the position determined by the stop.

Upon release of the key, it is restored by a spring 182 stretched between the upper end of the key plate 46 and hooks 184 formed integrally with the upper edge of the cover plate 48. The bail arms 120 and 122 and the parts carried thereby are restored to normal position by a pair of springs 186 which is tensioned between hooks 188 formed integrally with the arms 120 and 122 and ears 190 struck from the plate 112.

Operating mechanism

Figure 1:
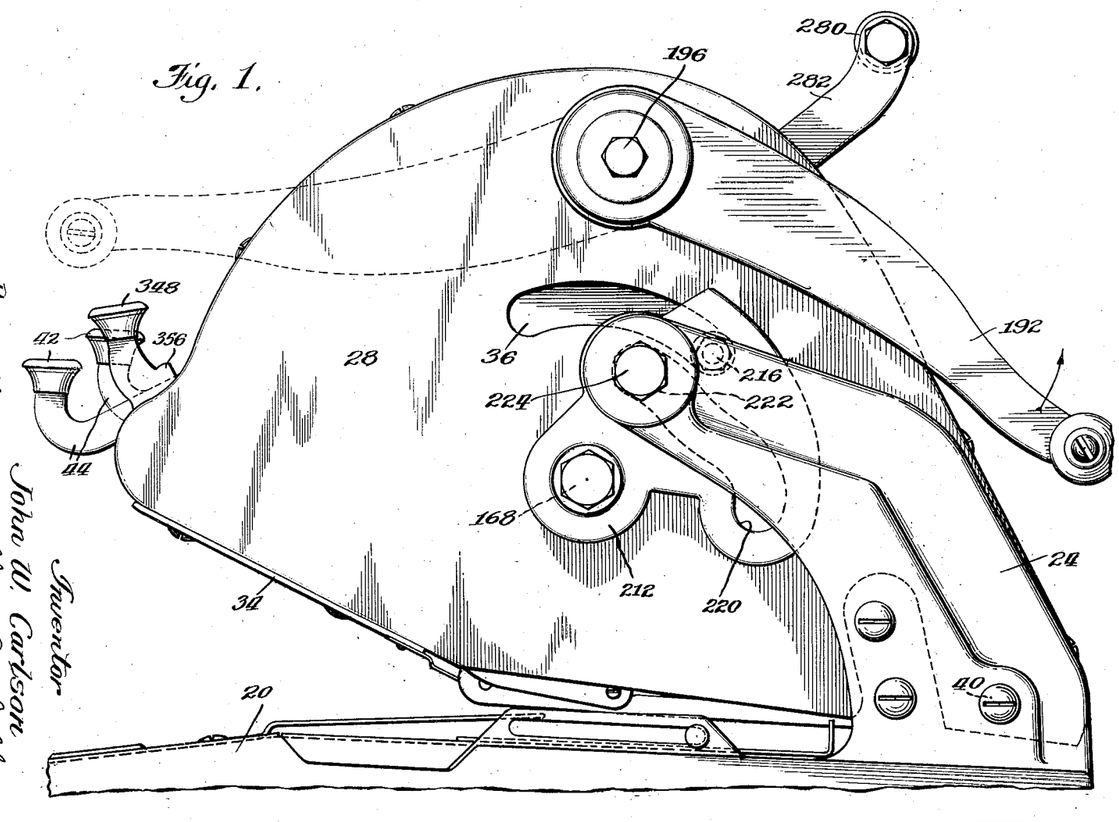
Fig. 1 is a right side elevation of a major portion of the check writer.
Figure 6:
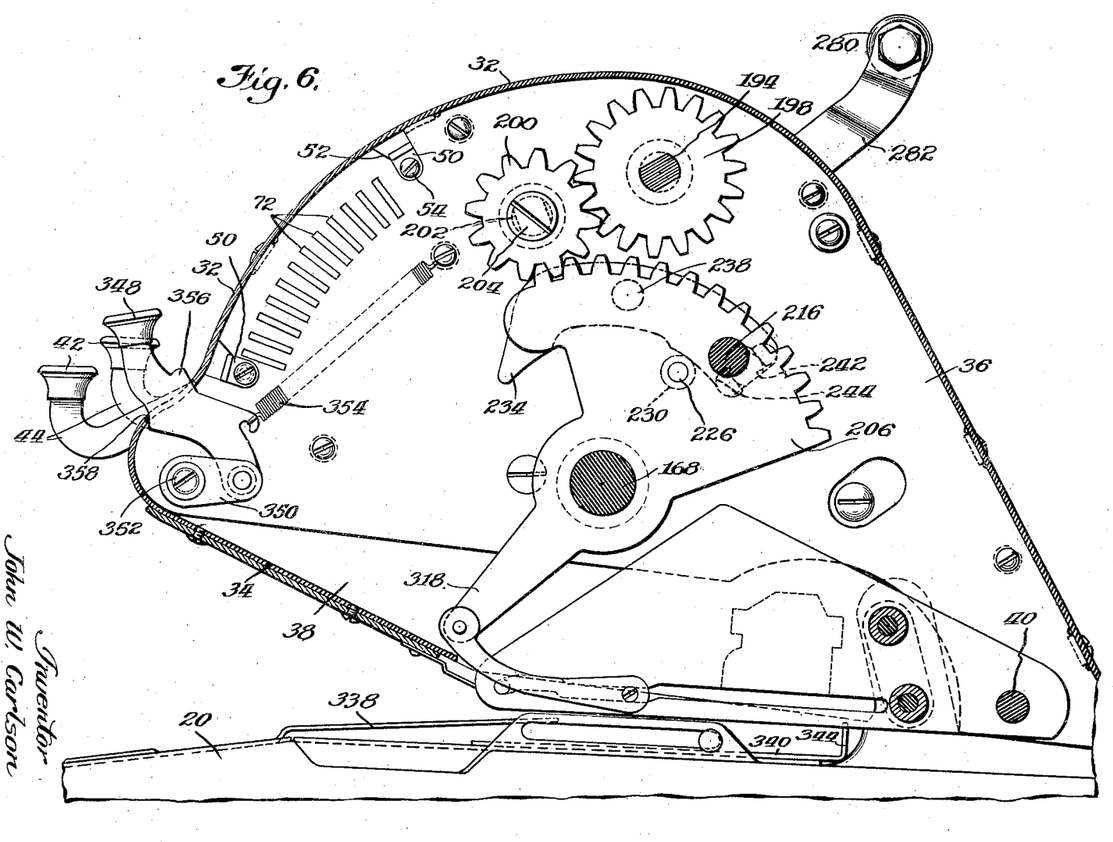

Referring to Figs. 1 and 6, an operating handle 192 is fixedly secured to a rotatable stub shaft 194 by a hex-head machine screw 196. The shaft 194 is mounted between the casing 28 and the right side frame 36 and has a gear 198 rigidly secured thereto. The gear meshes with a pinion 200 carried at the end of a shaft 202, being non-rotatably secured thereto by a screw 204. The pinion 200 meshes with a segmental gear 206 which is pivoted upon the main shaft 168.

Figure 7:
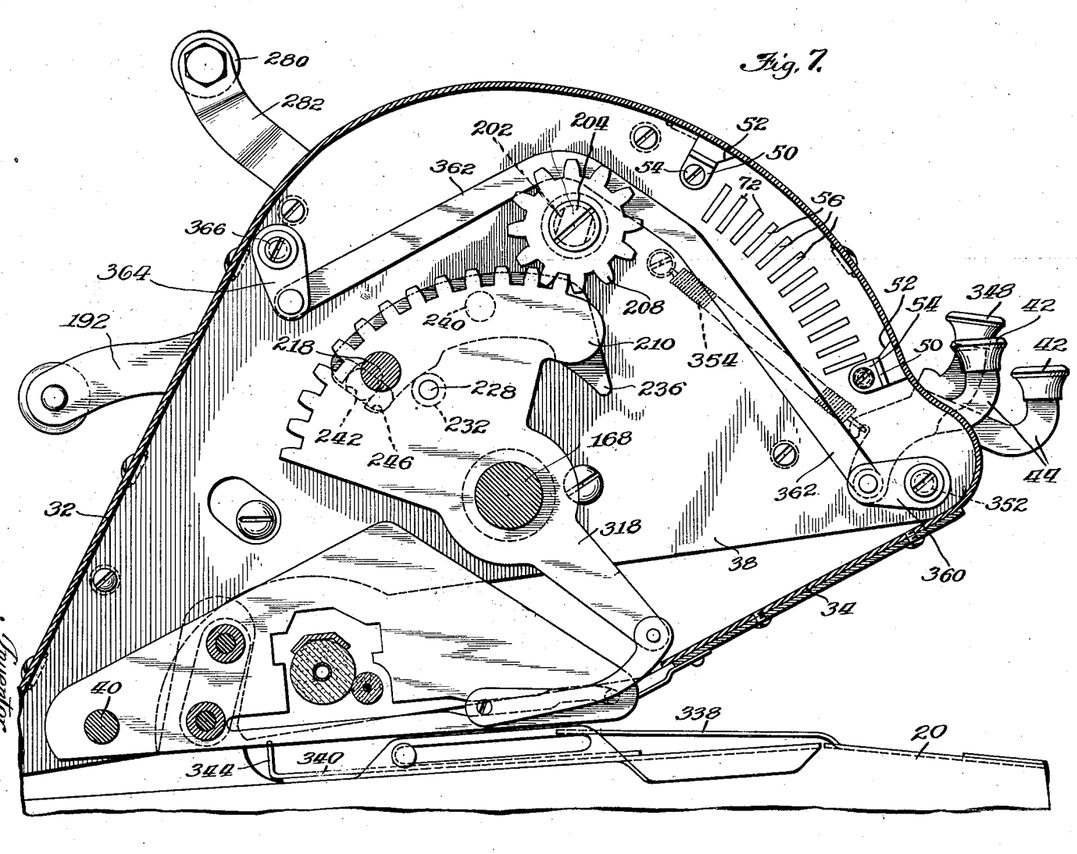
Fig. 7 is a longitudinal vertical section taken on the line 7—7 of Fig. 2, looking from the left-hand side of the machine.

As shown in Figs. 2 and 7, the shaft 202 extends transversely the full width of the machine and at its other end has a pinion 208 (similar to pinion 200) meshing with a segmental gear 210 which is pivotally mounted on shaft 168. A pair of cam plates 212 and 214 are pivotally mounted upon the main shaft 168 and are rigidly connected to the segmental gears 206 and 210, respectively, by screws 216 and 218, respectively. The cam plates 212 and 214 each has an irregular cam slot 220 formed therein which is adapted to receive a roller 222 carried by a stud 224. The studs 224 are mounted in the arms 24 and 26.

As previously mentioned, the side frames 36, 38 and the casing are pivoted upon a shaft 40 which is fixedly mounted between the arms 24 and 26 so that operation of the operating handle in a counterclockwise direction will, through the gear 198, pinions 200 and 208, segments 206 and 210, and cam plates 212 and 214, swing the casing, and all the parts mounted therein, downwardly, and upon operation of the handle 192 in the opposite direction restore the casing to the normal position shown in Fig. 1.

Type segment aligning means

Projecting inwardly from each of the gear segments 206 and 210 are studs 226 and 228 carrying rollers 230 and 232. These rollers are adapted to engage the lower edge surfaces of pivotally mounted levers 234 and 236. The levers 234 and 236 are mounted for free pivotal movement upon studs 238 and 240 carried by the side frames 36 and 38, respectively. The rear ends of the levers 234 and 236 are slotted to receive an aligner bar 242 which is mounted for lateral sliding movement in slots 244 and 246 formed in the side plates 36 and 38, respectively. The aligner bar 242 is adapted to engage in the notches formed between the teeth 160 of the type segment plates 150 and thereby position the type 154 on these segments in exact alignment previous to the printing and scarifying operation.

Restoring mechanism

As previously stated, the shaft 202 is rocked back and forth upon each operation of the machine. This shaft carries a pair of ratchet toothed plates 248 which are fixed to the shaft to rotate therewith. A pair of toothed arms 250 are pivotally connected to a pair of bail arms 252, the arms 250 having rearward extensions 254 to which springs 256 are attached, the springs being anchored to lugs 110 formed on the plate 112.

The springs 256 normally hold the arms 250 with their lower edge surfaces resting upon toothed plates 248. The arms 252 are integral with a restoring bar 258 which extends transversely across the machine. The bail thus formed by the arms 252 and restoring bar 258, hereinafter referred to as the restoring bail, is adapted to swing about the shaft 104 and lies behind the rear ends of the pawls 96 and the arms 102.

Upon rocking of the shaft 202, the toothed plates 248 will engage in the teeth formed in the arms 250 and thereby draw the arms, and hence the restoring bail, forwardly until the blank portions 260 of each of the toothed plates 248 engage with the surfaces 262 of the arms 250 when the arms will be forced upwardly, disengaging their teeth from the toothed plates 248 and permitting the springs 256 to return the restoring bail to normal position, as shown in Figs. 4 and 5.

An arm 264 having an inwardly projecting stud 266 at its end is rotatably mounted on the shaft 202 adjacent each of the toothed plates 248. The studs 266 have rollers 268 thereon. Each of the arms 264 has a pair of notches 270 and 272 formed thereon and spaced approximately 240 degrees apart, the notches being adapted to be engaged by sidewardly extending lugs 274 formed upon each of the toothed plates 248.

A spring 276 forcing the leftmost arm 264 against the plate 248 has its end hooked over the arm 264 so as to tend normally to rotate said arm clockwise (Fig. 5). The arm 264 at the right of the machine is also biased to move in a clockwise direction by a suitable spring mounted between the plate 36 and the casing 28. On the forward stroke of the operating handle the toothed plates 248 are rotated clockwise and hence the arms 264 also swing clockwise until they strike against shaft 104. Upon the latter portion of the return stroke of the operating handle the toothed plates are being rotated counterclockwise. Their lugs 274 will pick up the arms 264 and rotate the arms counterclockwise. At this time the restoring bail 252 will have been drawn forward by the arms 250 so that the pins and rollers 266, 268 will lie behind outwardly projecting pins 278 riveted to the arms 252 of the restoring bail. Further counterclockwise movement of the plates 248 will cause the arms 264 to be raised upwardly and through the rollers 268 cam the restoring bail forwardly so as to insure a complete operation thereof and the complete restoration of all of the pawls 96 and associated mechanism. The rollers 268 will pass upwardly behind the pins 278 and just prior to the termination of the return stroke of the operating handle will release the restoring bail, permitting it to return to normal position under the influence of springs 256.

An alternative means for restoring the setting up mechanism is provided. This consists of a handle 280 extending transversely across the machine, the handle being carried by a pair of arms 282 which are pivotally mounted upon the shaft 104. Pivotally mounted about each of these arms is a latch member 284 having a sidewardly extending lug 286 fitting in a notch 288 formed in the arm 282. The latch 284 is thus capable of only a limited degree of pivotal movement. The latch carries a second sidewardly extending lug 290 which normally lies directly behind a tooth 292 formed on the arm 250. Thus, by swinging the handle 280 forwardly the lug 290 will engage the tooth 292 and thereby move the restoring bail forwardly and clear the setting up mechanism without necessitating the operation of the machine.

*Payee's name scarifying means*

It is desirable to scarify that portion of the check upon which the payee's name appears to prevent alteration thereof. I have provided such means in my machine, these means being operated by the restoring handle 280 through a pair of crescent shaped links 294 which are pivotally connected at one end to the lower end of the arms 282 and at their other ends are pivotally connected to a pair of presser arms 296 which are pivotally mounted upon the shaft 40. The presser arms 296 are normally held in the upper position shown in Fig. 4 by springs 297 which are anchored to the plate 112. The arms 296 have depending foot portions 298 which are adapted to contact with a rod 299 carried by spring wire arms 301 which are hooked through the base plate of an ink pad carrier 322 which will hereinafter be described. The rod 299 is thus adapted to be forced downwardly by the foot portions 298 and thereby depress a matrix 300 which is carried by suitable arms 302 pivoted on the shaft 40 and which are normally held upwardly by springs 303.

The matrix 300 is adapted to cooperate with a platen 304 which has a striated or otherwise roughened upper surface complemental to the lower surface of the matrix 300. A bar 306 is vertically slidable in the platen 304 and is adapted to strip the check from the platen after the check has been scarified thereby, being pressed upwardly by a pair of flat springs 308 which are secured to the platen supporting plate 310, the latter being bolted to the base casting 20.

Figure 15:
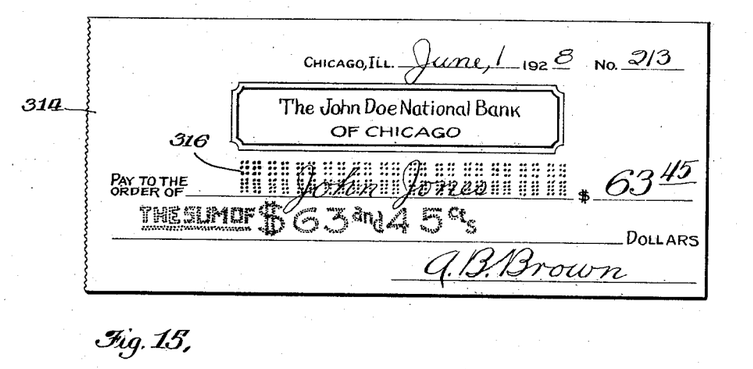
Fig. 15 is a facsimile of a check upon which the amount has been inserted and the payee's name scarified by the use of my improved machine.
Figure 16:
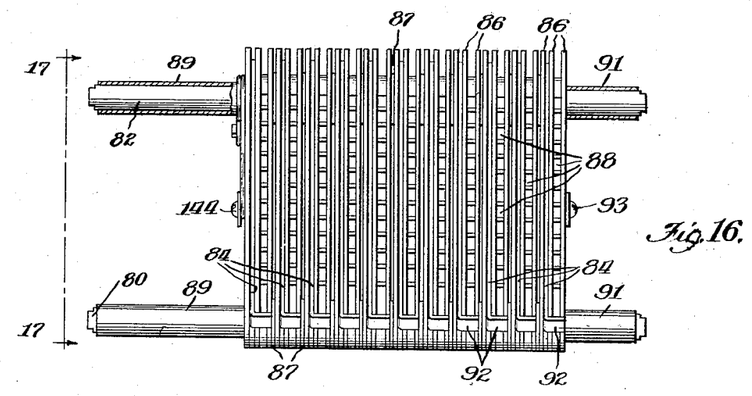
Fig. 16 is an elevation of the pawl release assembly.
Figure 17:
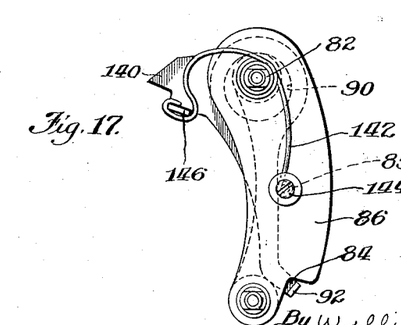
Fig. 17 is a side elevation of said last-named assembly taken on the line 17—17 of Fig. 16.

The top of the bar 306 has sidewardly extending projections 312 which are adapted to be depressed into suitable recesses formed in the platen 304 when the scarification is taking place and, when the matrix 300 is raised, to strip the check from the striations or points on the platen. The effect of the payee's name scarifying means is illustrated on the facsimile check 314 shown in Fig. 15, in which the scarifications 316 effectively prevent alteration of the payee's name "John Jones".

*Type inking and platen mechanism*

Suitable means are provided to ink the type just prior to making the impression. These means are operated by depending arms 318 formed integrally with the sector plates 206. This inking mechanism is of well-known construction and it is believed need not be further described here. Reference may be had to the co-pending application of Carl M. Hedman, Serial No. 718,687, filed June 9, 1924, for a detailed description and disclosure of this mechanism. Suffice it here to say that an ink pad 320 is mounted on a carrier 322 which is moved upwardly so as to ink the type which are set in printing position just prior to taking the printing impression and immediately thereafter the ink pad is withdrawn from beneath the type to permit them to move downwardly into contact with a platen 324 which is secured to the plate 310.

A logotype 326 for the impression of the indicia "The sum of $" has a dovetail groove formed in its upper surface so as to permit it to be slid over a logotype carrier 328 which is held stationary in the machine by the shafts 168 and 104. The lower end of the logotype carrier 328 has a vertical bore 330 therein which is adapted to receive a spring pressed plunger pin 332. As the logotype is slid upon its carrier the pin 332 will drop into a suitable recess 334 formed in the logotype 326 and lock the latter in position. In some instances it is desirable to have the logotype removable from its support, in which event a suitable sloping groove leading to the lower end of the recess 334 is provided, while in other cases it is desirable permanently to attach the logotype to its support, in which event the sloping guide groove is preferably of the depth shown in Fig. 8. After a logotype has been attached to its support in the latter manner, it forms a permanent part of the machine and may be used to print a word, a number or a trademark individual to the owner of the machine in place of the words "The sum of $". The logotype is adapted to cooperate with a platen 336 secured to the plate 310 and is of course inked by the ink pad 320 at the same time that the type are inked. A suitable thin resilient plate 338 is secured to the base casting 20 and is adapted to guide the check between the type and the platen and to strip the check from the platens 314 and 336 after an impression has been made.

Figure 9:
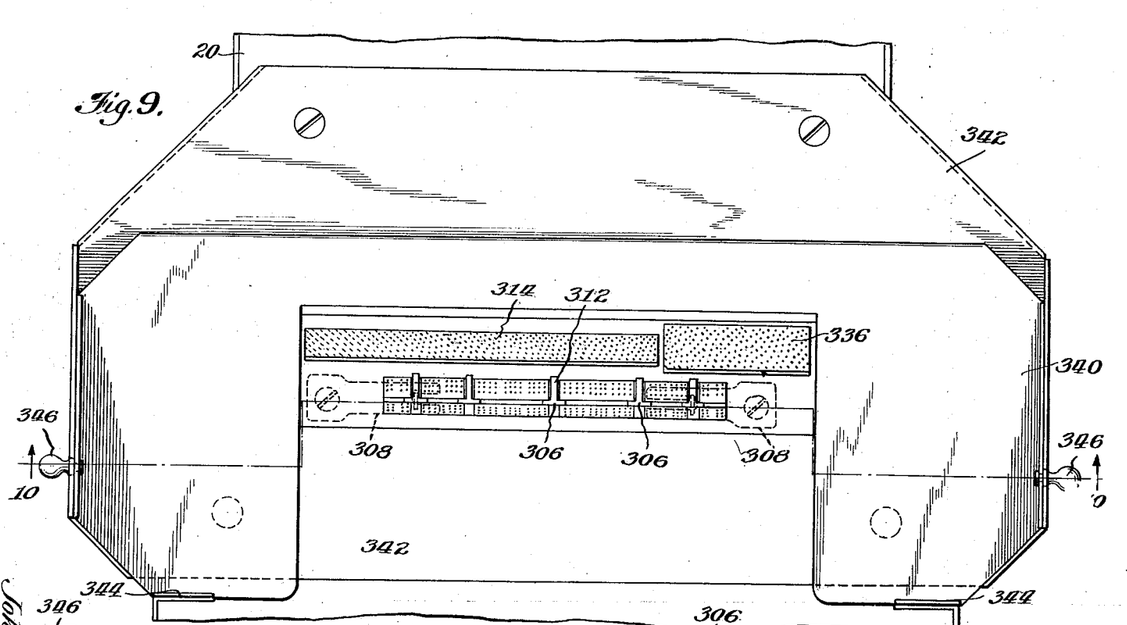
Fig. 9 is a plan view of a portion of the base of the machine showing particularly the check guide and platen arrangement.
Figure 10:
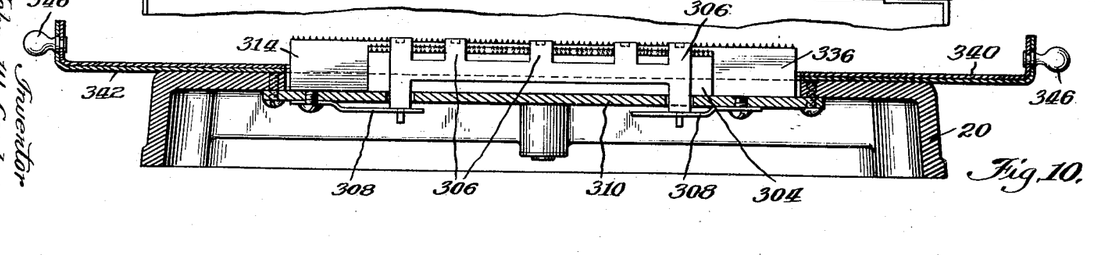
Fig. 10 is a vertical cross sectional view taken on the line 10—10 of Fig. 9.

A suitable check positioning guide 340 (Figs. 9 and 10) is slidably mounted upon the plate 342 which is secured to the base of the machine. The guide plate 340 has upwardly extending ears 344 which form abutments to position the check. Suitable finger pieces 346 are secured to the plate 340 to permit manual adjustment of the position of the plate.

Repeat mechanism

A repeat key 348 has its stem pivotally connected to an arm 350 rigidly secured to a shaft 352 and is normally held in its upper position by a spring 354. The repeat key has a projection 356 which is adapted to engage beneath the casing 32 at the edge of a slot 358 which is formed in the casing to receive the repeat key stem. An arm 360, similar to the arm 350, is secured to the left-hand end of the shaft 352 and has its outer end pivotally connected to a link 362. The rear end of the link 362 is pivotally connected to an arm 364 which is non-rotatably secured to a shaft 366 which is rotatably mounted in the side frames 36 and 38. The shaft 366 has a pair of two armed members 368 secured thereto, one arm 370 of which has a sidewardly projecting lug 372 which is adapted to contact with the lower end 374 of the arms 250 and thereby swing the arms 250 clockwise and prevent their engagement with the teeth of the plates 248.

The other arm 376 of the member 368 is adapted to contact with the end of the pawl 284 and swing the latter counterclockwise to raise its lug 290 above the projection 292 formed on the arm 250. With the repeat key thus depressed, the operation of the handle 192 will not cause restoration of the type segment positioning mechanism nor will the operation of scarifying the payee's name be in any way affected.

Upon depression of the repeat key, the shaft 352 will be rocked clockwise. This shaft carries a pair of stop arms 378 which are swung clockwise until their ends lie within notches 380 formed in the arms 120 and 122. Thus, when the repeat key is depressed, the arms 120 and 122 and hence the rod 126 and all of the keys 42 will be locked against movement.

Operation

Having adjusted the guide plate 340 to the position suited for the particular size of check to be protected, the check is placed in the machine with its upper edge abutting the ears 344. Let us assume that it is desired to print and scarify the amount $63.45 upon the check, as shown in the facsimile check in Fig. 15. The operator, assuming that the machine is in normal clear position, will depress the "6" key 42. Upon depression of this key its stem will rock the bail arms 120, 122 counterclockwise and through the bar 138 move the leftmost release member 84 forwardly. This member, through contact of its toe 92 with the end 94 of the stop pawl 96, will release the tooth 98 from the lowermost notch of the notched plate 88, the downward movement of the rod 128 permitting the stop pawl 96 to be thus released.

While the stop pawl is being thus released, the stop bar 56 corresponding to the numeral 6 will be moved inwardly and to the right in position to provide a stop, which will, as the stop pawl 96 is drawn upwardly and rearwardly by its spring 106, arrest movement of the pawl and cause it to be cammed inwardly to mesh its tooth 98 in the notch in the plate 88 corresponding to the numeral 6.

Substantially simultaneously with the initiation of the swinging movement of the stop pawl 96, springs 176 will rotate the leftmost type segment counterclockwise and the segmental gear 122 and arm 174 clockwise. However, as previously pointed out, due to the light weight of the stop pawl 96 and the parts connected thereto, the pawl will move extremely rapidly to the position in which its tooth 98 is in mesh with the notch corresponding to the numeral 6 in the plate 88. The type segment, with its sector 172, will move more slowly due to its greater weight and will rotate until the arm 174 is arrested by the lug 180 on the arm 102 which of course is held in position by the pawl 96. As soon as the leftmost type segment 150 has moved from its normal position, the releasing member 84, which is in the order second from the left, will drop since the flattened portion 148 of the leftmost type segment will have been removed as a support beneath the lug 146 of the second releasing member 84.

Upon releasing the key its spring 182 will return the key and key plate to normal position while at the same time the spring 186 will return the arms 120 and 122 and parts carried thereby to their initial position. The pawl 96 will be held with its tooth 98 in the proper notch in the plate 88 since the angle of the contacting edges of the tooth 98 and the edges of the notch in the plate 88 is such that the spring 106 cannot pull the pawl 96 from its notch in the plate.

It will be noted that the pawls 96 are normally locked with their teeth 98 in the lowermost notches of the plates 88 by the bar 128 and are only released when a key is depressed. The keys 42 corresponding to the numerals and indicia "3", "and", "4", "5" and "Cts" are next successively depressed, whereupon the type on the segments 150 corresponding to the keys depressed will be successively positioned (from left to right) so as to lie above the platen 314. After all of the keys have thus been depressed and the type positioned, the operating handle 192 is pulled forwardly to the position shown in dotted lines in Fig. 1 and the casing and inside frames, together with the mechanism contained therein, is swung on the shaft 40 due to the cooperation of the cam slots 220 with the rollers 222. Just previous to the completion of the forward stroke of the operating handle the type positioned above the platen will have been inked by the pad 320 so that at the end of the forward stroke the type are brought downwardly against the platen 324 to print and scarify the amount upon the check.

Just prior to the printing impression the aligner bar 242 will be forced downwardly in the slots 246 by the cams 234 and through engagement with the notches 160 in the type segment plates 150 accurately align the type 154 as shown in Fig. 5.

During the forward stroke of the operating handle the toothed plates 248 will have been rotated clockwise through an angle of more than 280° and the toothed arms 250 will, upon the beginning of the return stroke, after the printing impression has been made, be meshed with the teeth on these plates and the arms 250 and hence the restoring bar 258 will be swung forwardly as the toothed plates 248 are rotated counterclockwise upon the return stroke. The restoring bar 258 will "pick up" the arms 102 which have been differentially positioned and restore them, with the type segments, to normal position.

If the operator desires to scarify the payee's name line of the check, he will swing the handle 280 forwardly, thereby depressing the matrix 300 through downward movement of the links 294 and arms 296. As the matrix 300 moves downwardly it depresses the stripper bar 306 so that the latter does not interfere with making the scarifications in the check and upon the return stroke of the handle 280 the matrix 300 will be raised due to the resiliency of the lift spring 303 and the spring pressed stripper bar 306 will also be raised to lift the check from the serrations or other projections on the platen 304. If the operator wishes to protect a number of checks of the same amount, as is frequently desirable in protecting a large number of checks of the same amount which are used in making up payrolls or paying dividends, etc., the amount is set up in the manner as previously described and the repeat key is then depressed, being held in depressed position through engagement of its projection 356 beneath the casing plate 32. As previously pointed out, depression of the repeat key will, through the arms 378, lock the setting up mechanism so that the amount cannot be changed by accidental manipulation of any of the keys 42. The repeat key will also raise the toothed arms 250 so that they will not be engaged by the toothed plates 248 and hence the restoring bar 258 will remain stationary and the pawl arms 96 and type segments 150 will remain in set position. Operation of the handle 280 will not effect restoration of these parts due to the fact that the depression of the repeat key raises the lugs 290 out of the path of the projections 292 on the toothed arms 250.

The amount set up may readily be observed through the window 118 in the casing plate 32 prior to taking the impression and if a mistake has been made in the depression of the keys and the proper amount does not show in this window, the operator can readily clear the machine merely by swinging the handle 280 forwardly when (assuming the repeat key to have been released) the lugs 290 on the arms 284 will abut against the projections 292 on the toothed arms 250 and move the latter forwardly and thus also swing the restoring bar 258 forwardly. When the restoring bar 258 is moved forwardly it will of course restore the pawls 96 and the type segments and parts associated therewith to normal position.

From the above description of the machine of my invention and its method of operation, it will be apparent that I have invented a machine which is relatively simple in construction, in which the majority of the parts may be stamped, in which the manufacturing tolerances may be relatively great and which may be operated very rapidly.

The invention is capable of wide variation within equivalent limits and I contemplate such variation as may be desirable or useful in the particular adaptation of the invention shown, or in its adaptation to other machines.

I do not restrict myself in any unessential particulars, but what I claim and desire to secure by Letters Patent is:

1. In a machine of the class described, the combination of a key having an arcuate plate secured thereto, a stop bar reciprocable transversely with respect to said plate, a pin and cam slot connection between said bar and said plate, and means to impart a lateral movement to said stop bar as an incident to its transverse movement.

2. In a machine of the class described, the combination of a depressible key, a horizontally reciprocable stop bar, an operative connection between said key and said bar, and cam means to move said bar laterally upon horizontal reciprocation thereof.

3. In a machine of the class described, the combination of a notched plate, stop bars adapted to be moved toward said plate, a type-bearing segment, and a pawl having a tooth adapted to be forced into one of the notches in said plate upon camming contact with one of said stop bars thereby to limit the movement of said type segment to selected printing position.

4. In a machine of the class described, a plurality of segments each carrying a similar group of type characters and each movable to position any selected one of its type characters in place for printing, resilient means tending normally to rotate said segments to bring their type to printing position, a plurality of keys, one for each type character on said segments, a stop member for each of said segments, and means controlled by said keys to release and selectively position said stop members in differential positions corresponding to the depressed keys, said stop members operating independently of said segments.

5. In a machine of the class described, the combination of a plurality of type carriers, a plurality of keys, each adapted selectively to control the positioning of any one of said type carriers, members normally holding said type carriers stationary, and means controlled by said carriers for conditioning said members for operation one after another.

6. In a machine of the class described, the combination of a plurality of type carrying segments mounted for coaxial rotation, a plurality of springs each operatively connected to rotate one of said segments, a plurality of depressible keys, means operable upon depression of any one of said keys to release one of said segments and thereby permit it to be rotated by its spring, and differentially movable stop means controlled by said keys adapted to limit the rotative movement of the released segment.

7. In a machine of the class described, the combination of a plurality of type segments, manipulative means for selectively positioning said segments in printing position, a platen for said type segments, a second platen adjacent thereto, a scarifying matrix adjacent said second platen, a handle, and means operative to said handle to move said matrix against said second platen and to restore said type segments to normal position.

8. In a machine of the class described, the combinaton of a plurality of depressible keys, stop bars controlled by said keys, a spring operated member adapted to be released upon actuation of one of said keys and to be arrested by one of said stop bars in a position corresponding to the value of the key depressed, and a type carrying element adapted to be positioned by said member.

9. In a machine of the class described, the combination of a plurality of type carriers, each carrying a plurality of type, a plurality of depressible keys, each adapted to be positioned for printing a predetermined type of any one of said carriers, and means operable by said carriers to condition said keys for successive control of said carriers.

10. In a machine of the class described, the combination of a depressible key, a horizontally reciprocable stop bar, cam means to move said bar laterally upon longitudinal movement thereof, a spring operated toothed stop member having a portion engageable with said bar, and a plate having a plurality of notches adapted to receive the tooth of said stop member.

11. In a machine of the class described, the combination of a plurality of type segments, manipulative means for selectively positioning said segments in printing position, a roughened platen for said type segments, a second roughened platen adjacent thereto, a scarifying matrix adjacent said second platen and having a surface complementary thereto, a handle to restore said type segments to normal position, and a toggle linkage operative by said handle to move said matrix against said second platen.

12. In a machine of the class described, the combination of a plurality of type carriers, a plurality of keys, each adapted selectively to control the positioning of any one of said type carriers, a combination latch and stop members, one associated with and normally holding each of said type carriers stationary, and releasing means therefor, each except the first of said members having a portion thereof cooperating with the next adjacent type carrier, said portion preventing the release of said member by said means unless the adacent type carrier has been selectively positioned.

13. In a machine of the class described, the combination of a plurality of type carrying segments mounted for coaxial rotation, a plurality of springs, one associated with and adapted to rotate each of said segments, a plurality of depressible keys, means operable upon depression of any one of said keys to release one of said segments and thereby permit it to be rotated by its spring, and differential stop means adapted to be selectively moved to any one of a plurality of set positions by said keys and thereafter to limit the rotative movement of the released segment.

14. In a machine of the class described, the combination of printing devices, a key having a plate secured thereto, a stop bar reciprocable transversely with respect to said plate, a pin and diagonal cam slot connection between said bar and said plate, means to impart a lateral movement to said stop bar as an incident to its longitudinal movement, and means for positioning one of said printing devices, said means being controlled by said stop bar.

15. In a machine of the class described, the combination of a plurality of manually depressible keys, a notched plate, key controlled stop bars adapted to be moved toward said plate, a type-bearing segment, a spring operated normally latched pawl having a tooth adapted to be forced into one of the notches in said plate upon camming contact with one of said stop bars thereby to limit the movement of said type segment to selected printing position, and means to unlatch said pawl upon the depression of any one of said keys.

16. In a machine of the class described, a plurality of type carriers movable to position any selected one of its type in printing position, springs tending normally to move said carriers to bring their type to printing position, a plurality of keys, a stop member for each of said carriers, and means controlled by said keys to release and selectively position said stop members one after another in any one of a plurality of different positions, said stop member setting means operating independently of said carriers.

17. In a machine of the class described, the combination of a plurality of depressible keys, stop bars controlled by said keys, a notched plate, a spring operated toothed member adapted to be released upon the actuation of any one of said keys, to be arrested by one of said stop bars and thereby forced into engagement with said notched plate, and an element adapted to be positioned by said member.

In witness whereof, I hereunto subscribe my name this 16th day of July, 1928.

JOHN W. CARLSON.